United States Patent
Kamio

(10) Patent No.: US 8,831,843 B2
(45) Date of Patent: Sep. 9, 2014

(54) HYDRAULIC PRESSURE CONTROLLER

(71) Applicant: Denso Corporation, Kariya (JP)

(72) Inventor: Shigeru Kamio, Nagoya (JP)

(73) Assignee: Denso Corporation, Kariya (JP)

( * ) Notice: Subject to any disclaimer, the term of this patent is extended or adjusted under 35 U.S.C. 154(b) by 35 days.

(21) Appl. No.: 13/860,943

(22) Filed: Apr. 11, 2013

(65) Prior Publication Data

US 2013/0270471 A1  Oct. 17, 2013

(30) Foreign Application Priority Data

Apr. 11, 2012  (JP) .................................. 2012-90089

(51) Int. Cl.
*G06F 7/00* (2006.01)
*F16K 31/06* (2006.01)
*F16H 61/04* (2006.01)

(52) U.S. Cl.
CPC ............ *F16K 31/0675* (2013.01); *F16H 61/04* (2013.01)
USPC .......................................................... 701/58

(58) Field of Classification Search
None
See application file for complete search history.

(56) References Cited

U.S. PATENT DOCUMENTS

| 5,762,581 | A | 6/1998 | Kozaki et al. |
| 6,895,940 | B2* | 5/2005 | Igashira ........................ 123/472 |
| 7,185,828 | B2* | 3/2007 | Igashira et al. ................. 239/88 |
| 2005/0077394 | A1* | 4/2005 | Igashira et al. ............ 239/533.1 |
| 2005/0278102 | A1 | 12/2005 | Kim et al. |
| 2012/0109457 | A1* | 5/2012 | Okamoto et al. ............... 701/36 |

FOREIGN PATENT DOCUMENTS

JP  11-063200  3/1999

OTHER PUBLICATIONS

Office Action (2 pages) dated Mar. 11, 2014, issued in corresponding Japanese Application No. 2012-090089 and English translation (1 page).

* cited by examiner

*Primary Examiner* — Thomas Tarcza
*Assistant Examiner* — Adam Alharbi
(74) *Attorney, Agent, or Firm* — Nixon & Vanderhye PC

(57) ABSTRACT

A hydraulic pressure controller is used to control output pressure of a solenoid valve in an oil-hydraulic circuit of a transmission of a vehicle. The hydraulic pressure controller includes an operation value setting section and a correction section. The operation value setting section sets a duty cycle of an operation signal based on a target exciting current and an actual exciting current of the solenoid valve. The operation signal is inputted to a driver circuit for driving the solenoid valve. The correction section corrects the duty cycle, the target exciting current, or the actual exciting current by using a filter for eliminating or damping a resonant frequency component of a vibration model of the output pressure.

12 Claims, 12 Drawing Sheets

HYDRAULIC PRESSURE CONTROLLER

CROSS REFERENCE TO RELATED APPLICATION

This application is based on Japanese Patent Application No. 2012-90089 filed on Apr. 11, 2012, the contents of which are incorporated herein by reference.

FIELD

The present disclosure relates to a hydraulic pressure controller for controlling output pressure of a solenoid valve in an oil-hydraulic circuit of a transmission of a vehicle.

BACKGROUND

When an exciting current of a coil of a solenoid valve is sharply changed, output pressure of the solenoid valve overshoots and then vibrates. In a hydraulic pressure controller disclosed in U.S. Pat. No. 5,762,581 corresponding to JP-A-H8-320066, an exciting current is gradually changed to reduce vibration in output pressure.

In the hydraulic pressure controller disclosed in U.S. Pat. No. 5,762,581, the vibration in output pressure is reduced at the expense of responsivity of the output pressure. As a result, a time necessary to control hydraulic pressure becomes longer.

SUMMARY

In view of the above, it is an object of the present disclosure to provide a hydraulic pressure controller for reducing vibration in output pressure of a solenoid valve without a reduction in responsivity of the output pressure.

According to a first aspect of the present disclosure, a hydraulic pressure controller is used to control output pressure of a solenoid valve in an oil-hydraulic circuit of a transmission of a vehicle. The hydraulic pressure controller includes a target value acquiring section, an actual value acquiring section, an operation value setting section, and a correction section. The target value acquiring section acquires a target exciting current which is a target value for an exciting current of the solenoid valve. The actual value acquiring section acquires an actual exciting current which is an actual measured value of the exciting current of the solenoid valve. The operation value setting section sets a duty cycle of an operation signal based on the target exciting current and the actual exciting current. The operation signal is inputted to a driver circuit for driving the solenoid valve. The correction section corrects at least one of the duty cycle, the target exciting current, and the actual exciting current by using a filter for eliminating or damping a resonant frequency component of a vibration model of the output pressure of the solenoid valve.

According to a second aspect of the present disclosure, a method is used to control output pressure of a solenoid valve in an oil-hydraulic circuit of a transmission of a vehicle. The method includes a step of acquiring a target exciting current which is a target value for an exciting current of the solenoid valve. The method further includes a step of acquiring an actual exciting current which is an actual measured value of the exciting current of the solenoid valve. The method further includes a step of setting a duty cycle of an operation signal based on the target exciting current and the actual exciting current. The operation signal is inputted to a driver circuit for driving the solenoid valve. The method further includes a step of correcting at least one of the duty cycle, the target exciting current, and the actual exciting current by using a filter for eliminating or damping a resonant frequency component of a vibration model of the output pressure of the solenoid valve.

According to a third aspect of the present disclosure, a computer-readable tangible media has machine-readable instructions that direct a computer to acquire a target exciting current which is a target value for an exciting current of a solenoid valve in an oil-hydraulic circuit of a transmission of a vehicle. The machine-readable instructions further direct the computer to acquire an actual exciting current which is an actual measured value of the exciting current of the solenoid valve. The machine-readable instructions further direct the computer to set a duty cycle of an operation signal based on the target exciting current and the actual exciting current. The operation signal is inputted to a driver circuit for driving the solenoid valve. The machine-readable instructions further direct the computer to correct at least one of the duty cycle, the target exciting current, and the actual exciting current by using a filter for eliminating or damping a resonant frequency component of a vibration model of output pressure of the solenoid valve.

BRIEF DESCRIPTION OF THE DRAWINGS

The above and other objects, features, and advantages will become more apparent from the following description and drawings in which like reference numerals depict like elements. In the drawings.

DETAILED DESCRIPTION

Embodiments of the present disclosure are described below with reference to the drawings.

(First Embodiment)

Figure 1:
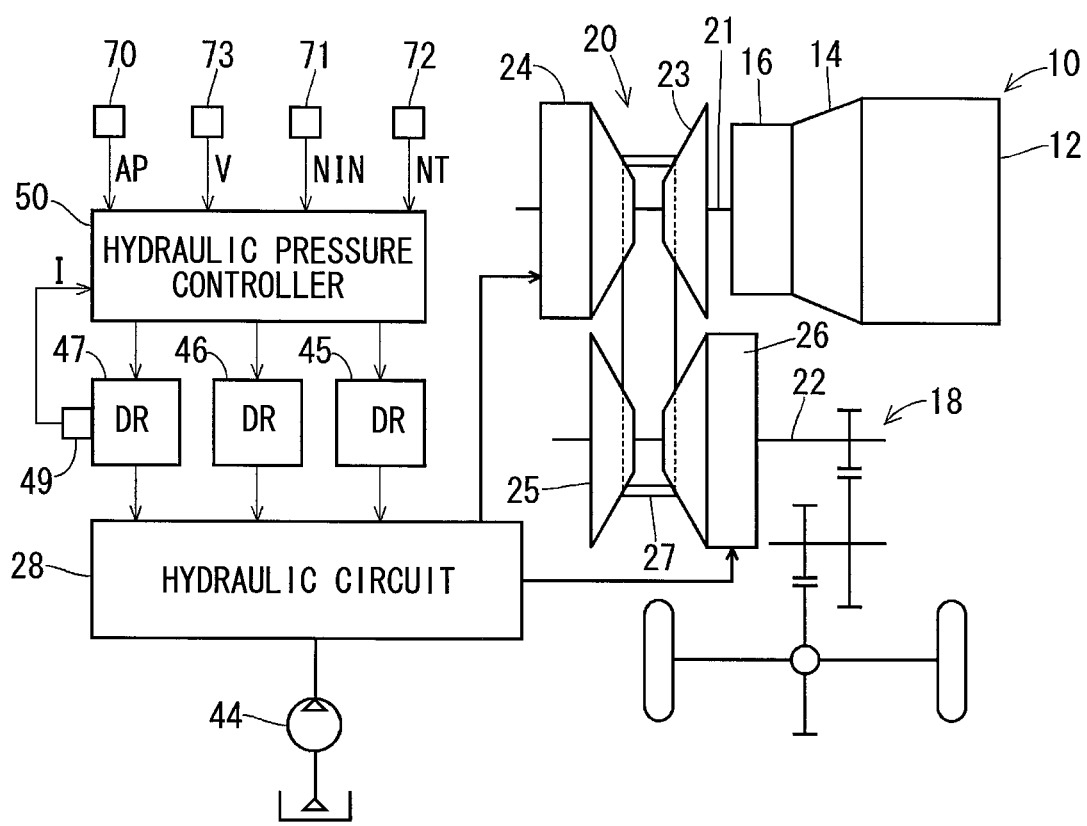
FIG. 1 is a diagram illustrating a continuously-variable transmission that employs a hydraulic pressure controller according to a first embodiment of the present disclosure.

A hydraulic pressure controller 50 according to a first embodiment of the present disclosure is configured to control an oil-hydraulic circuit 28 of a continuously-variable transmission (CVT) 20 shown in FIG. 1. The CVT 20 is provided in a driving apparatus 10 of a vehicle. The CVT 20 changes a speed of rotation, which is inputted from an engine 12 through a torque converter 14 and a forward/backward movement switcher 16, and outputs the rotation to a reducing gear 18.

Figure 2:
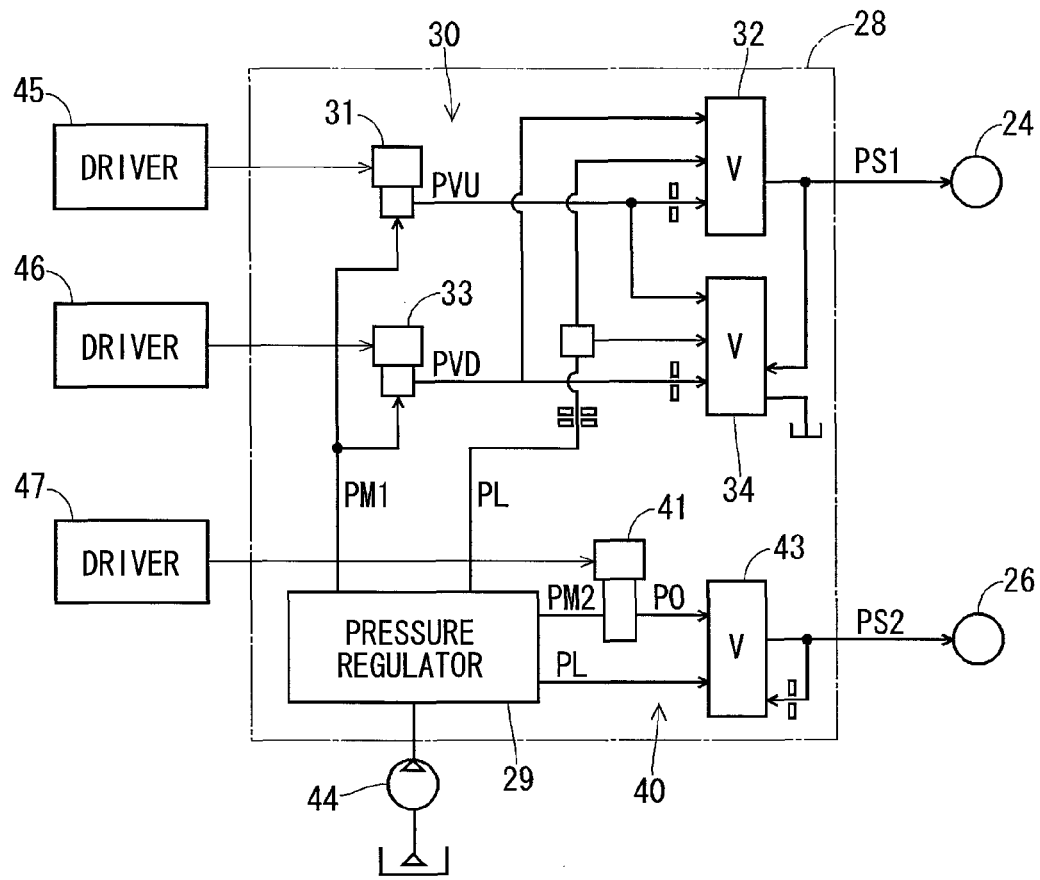
FIG. 2 is a diagram illustrating an oil-hydraulic circuit.

Firstly, the CVT 20 is described bellow with reference to FIGS. 1 and 2. The CVT 20 includes an input shaft 21, an output shaft 22, a primary pulley 23, a secondary pulley 25, a power transmission belt 27, and the oil-hydraulic circuit 28. The input shaft 21 and the output shaft 22 are arranged parallel to each other. The primary pulley 23 rotates with the input shaft 21. The secondary pulley 25 rotates with the output shaft 22. The transmission belt 27 is wound on the primary pulley 23 and the secondary pulley 25. A width of a groove of the primary pulley 23 changes according to hydraulic pressure in a hydraulic cylinder 24, and a width of a groove of the secondary pulley 25 changes according to hydraulic pressure in a hydraulic cylinder 26.

A diameter of the transmission belt 27 on the pulleys 23 and 25 changes according to the widths of the grooves of the pulleys 23 and 25. A gear ratio of the CVT 20 continuously changes with the change in the diameter of the transmission belt 27. The gear ratio of the CVT 20 is a ratio of the number of rotation of the input shaft 21 and the number of rotation of the output shaft 22. The hydraulic cylinder 24 is a hydraulic actuator used to change the gear ratio of the CVT 20. The hydraulic cylinder 26 is a hydraulic actuator used to change a clamping force applied to the transmission belt 27.

As shown in FIG. 2, the oil-hydraulic circuit 28 includes an original pressure regulator 29, a transmission controller 30, and a clamping force controller 40. The original pressure regulator 29 regulates pressure of hydraulic oil, which is pumped by a hydraulic pump 44, to a line pressure PL, to a first modulator pressure PM1, and to a second modulator pressure PM2.

The transmission controller 30 includes an electromagnetic on-off valve 31, a flow rate control valve 32, an electromagnetic on-off valve 33, and a flow rate control valve 34. The electromagnetic on-off valve 31 and the flow rate control valve 32 are used for upshift. The electromagnetic on-off valve 33 and the flow rate control valve 34 are used for downshift. The electromagnetic on-off valve 31 is duty-controlled by a hydraulic pressure controller 50 through a driver circuit 45 so that the first modulator pressure PM1 can be regulated to a predetermined control pressure PVU. The flow rate control valve 32 is driven by the control pressure PVU. The flow rate control valve 32 supplies a supply pressure PS1, which is regulated based on the line pressure PL, to the hydraulic cylinder 24, thereby reducing the width of the groove of the primary pulley 23 so that the gear ratio can be reduced.

The electromagnetic on-off valve 33 is duty-controlled by the hydraulic pressure controller 50 through a driver circuit 46 so that the first modulator pressure PM1 can be regulated to a predetermined control pressure PVD. The flow rate control valve 34 is driven by the control pressure PVD. The flow rate control valve 34 opens a drain port 35 according to the control pressure PVD and drains the hydraulic oil in the hydraulic cylinder 26, thereby increasing the width of the groove of the primary pulley 23 so that the gear ratio can be increased.

The clamping force controller 40 includes a spool-type linear solenoid valve 41 and a clamping force control valve 43. The linear solenoid valve 41 regulates the second modulator pressure PM2 to a predetermined output pressure PO according to an exciting current supplied from a driver circuit 47. The clamping force control valve 43 is driven by the output pressure PO. That is, the output pressure PO is pilot pressure for the clamping force control valve 43. The clamping force control valve 43 outputs a supply pressure PS2, which is regulated based on the line pressure PL, to the hydraulic cylinder 26, thereby adjusting the width of the groove of the secondary pulley 25 so that the clamping force on the transmission belt 27 can be controlled. The clamping force control valve 43 corresponds to a pressure regulating valve in claims.

Figure 3:
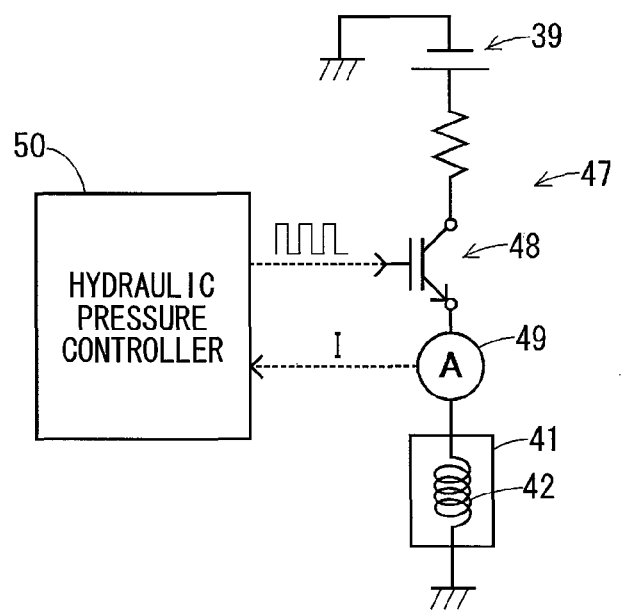
FIG. 3 is a diagram illustrating a driver circuit for driving a linear solenoid valve.

As shown in FIG. 3, the driver circuit 47 has a transistor 48 as a switching element. The transistor 48 is connected between a power source 39 and a coil 42 of the linear solenoid valve 41. An exciting current of the coil 42 can be adjusted by adjusting a duty cycle of the transistor 48, which is the ratio of the ON-period of the transistor 48 to the time of one cycle. A current sensor 49 measures an actual exciting current I of the coil 42.

Next, the hydraulic pressure controller 50 is described below with reference to FIGS. 4-7 in addition to FIG. 1.

The hydraulic pressure controller 50 is configured as a microcomputer having a central processing unit (CPU), a random access memory (RAM), a read-only memory (ROM), and an input/output interface (I/O). The hydraulic pressure controller 50 controls the linear solenoid valve 41, the electromagnetic on-off valve 31, and the electromagnetic on-off valve 33 by executing a predetermined control program based on detection signals from sensors. Specifically, the hydraulic pressure controller 50 receives the detection signals from the current sensor 49, an accelerator position sensor 70, an input rotation speed sensor 71, an input shaft torque sensor 72, and a vehicle speed sensor 73. The accelerator position sensor 70 detects an accelerator open degree AP indicative of the amount of operation of an accelerator pedal of the vehicle. The input rotation speed sensor 71 detects an input rotation speed NIN of the CVT 20. The input shaft torque sensor 72 detects an input shaft torque NT of the CVT 20. The vehicle speed sensor 73 detects a running speed V of the vehicle.

Figure 4:
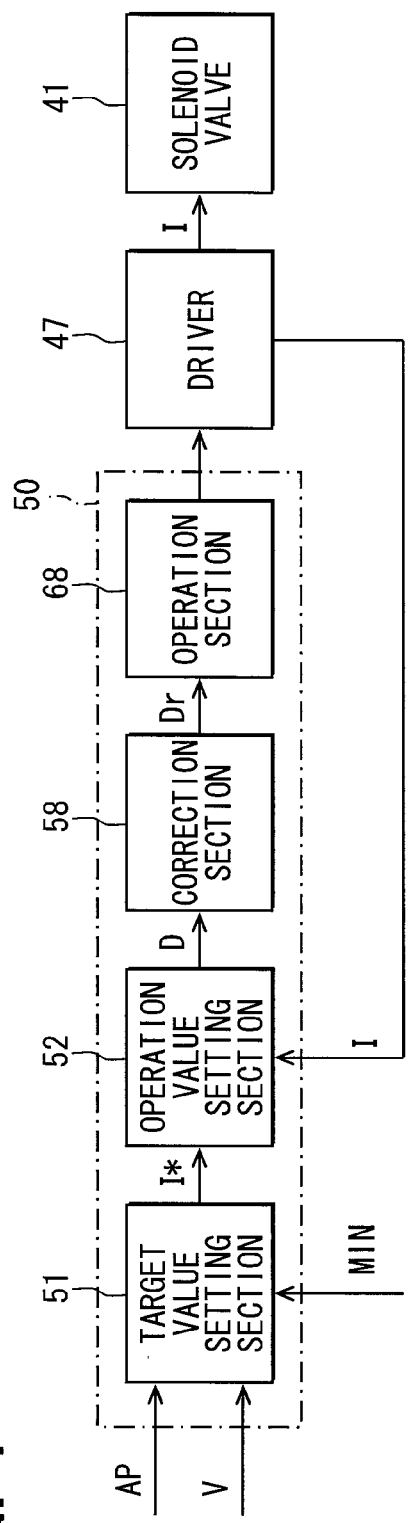
FIG. 4 is a block diagram of the hydraulic pressure controller.
Figure 5:
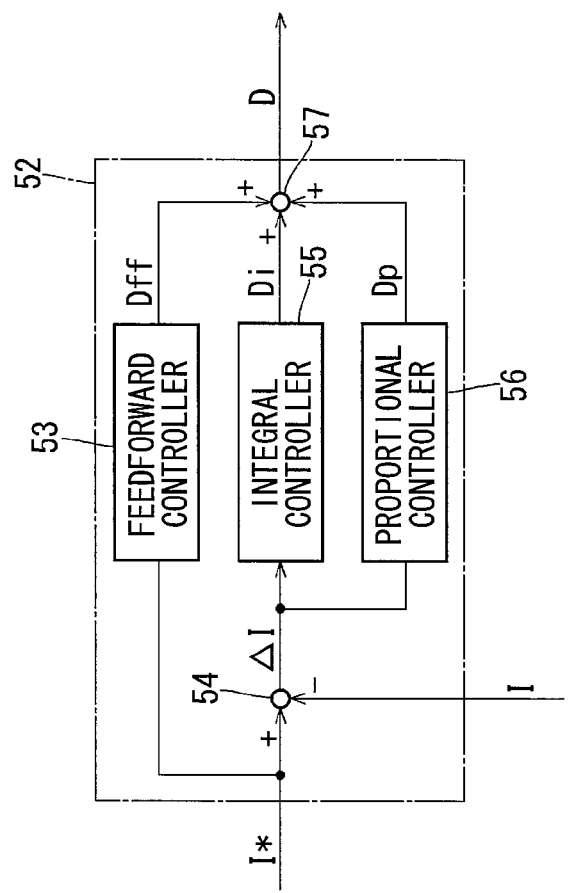
FIG. 5 is a block diagram of an operation value setting section of the hydraulic pressure controller.
Figure 6:
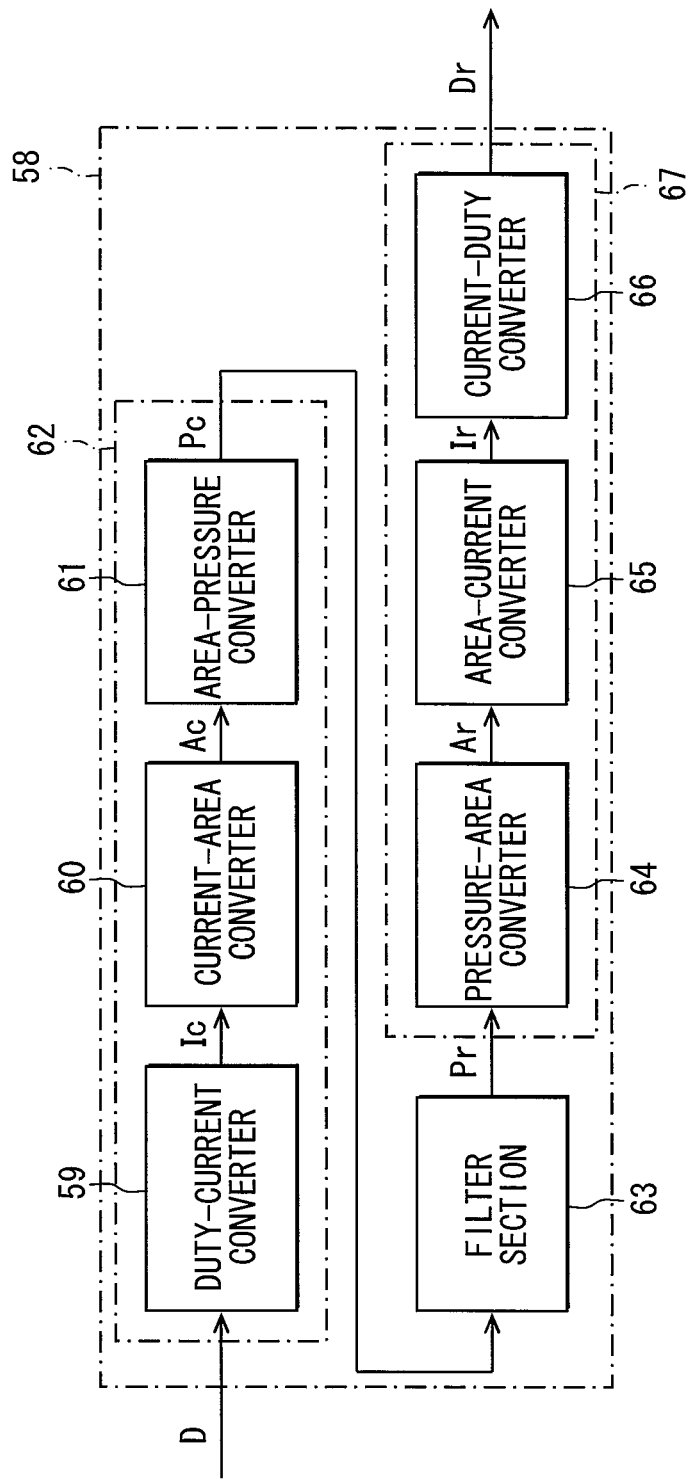
FIG. 6 is a block diagram of a correction section of the hydraulic pressure controller.

As shown in FIGS. 4-6, the hydraulic pressure controller 50 has various functions of controlling the clamping force. Although not shown in the drawings, the hydraulic pressure controller 50 has a gear shift control section for controlling gear shift. The gear shift control section calculates a target input rotation speed of the CVT 20 based on the accelerator open degree AP and the running speed V by using a target input calculation table stored in, for example, the ROM. Then, the gear shift control section drives the electromagnetic on-off valves 31 and 33 by controlling the driver circuits 45 and 46 in such a manner that the actual input rotation speed NIN becomes equal to the target input rotation speed.

As shown in FIG. 4, the hydraulic pressure controller 50 includes a target value setting section 51, an operation value setting section 52, a correction section 58, and an operation section 68. The target value setting section 51 has a gear ratio calculator, a necessary hydraulic pressure calculator, and a target value calculator. The target value setting section 51 sets a target value of a control system, i.e., a target exciting current I*. The gear ratio calculator calculates the gear ratio of the CVT 20 based on the input rotation speed NIN and the running speed V. The necessary hydraulic pressure calculator calculates a necessary hydraulic pressure in the hydraulic cylinder 26 based on the gear ratio and the input shaft torque NT by using a hydraulic pressure calculation table stored in, for example, the ROM. Further, the necessary hydraulic pressure is calculated based on vehicle conditions such as whether an engine 12 is running, whether the forward/backward movement switcher 16 is switched to a forward movement side or a backward movement side, and whether the vehicle is started on a hill. The target value calculator calculates the target exciting current I* based on the necessary hydraulic pressure by using a pressure-area conversion table shown in FIG. 7 and an area-current conversion table shown in FIG. 8.

The operation value setting section 52 acquires the target exciting current I* and the actual exciting current I. The operation value setting section 52 sets an operation value of the control system. Specifically, the operation value setting section 52 sets a duty cycle of an operation signal inputted to the driver circuit 47. The operation value setting section 52 corresponds to a target value acquiring section, an actual value acquiring section, and an operation value setting section in claims.

As shown in FIG. 5, the operation value setting section 52 includes a feedforward controller 53, a comparator 54, an integral controller 55, a proportional controller 56, and an adder 57. The feedforward controller 53 calculates a feedforward term Dff based on the target exciting current I*. The comparator 54 calculates a deviation ΔI between the target exciting current I* and the actual exciting current I. The integral controller 55 calculates an integral term Di based on the deviation ΔI. The proportional controller 56 calculates a proportional term Dp based on the deviation ΔI. The adder 57 calculates a duty cycle D by adding the feedforward term Dff, the integral term Di, and the proportional term Dp together. Thus, the operation value setting section 52 adjusts the duty cycle D so that the deviation ΔI between the target exciting current I* and the actual exciting current I can be reduced. The integral controller 55 and the proportional controller 56 correspond to a feedback controller in claims.

Referring back to FIG. 4, the correction section 58 corrects the duty cycle D, which was set by the operation value setting section 52, to a corrected duty cycle Dr in such a manner that vibration in the output pressure PO of the linear solenoid valve 41 is reduced. Specifically, as shown in FIG. 6, the correction section 58 includes a first converter 62, a filter section 63, and a second converter 67. The first converter 62 has a duty-current converter 59, a current-area converter 60, and an area-pressure converter 61. The second converter 67 has a pressure-area converter 64, an area-current converter 65, and a current-duty converter 66.

The first converter 62 converts the duty cycle D to a suitable hydraulic pressure Pc which is the form suitable for a filtering process in the filter section 63. Firstly, the duty-current converter 59 converts the duty cycle D to a suitable exciting current Ic by using a current-duty conversion table shown in FIG. 9. The current-duty conversion table defines a non-linear relationship between the duty cycle D and the exciting current I. Then, the current-area converter 60 converts the suitable exciting current Ic to a suitable open area Ac by using a area-current conversion table shown in FIG. 8. The area-current conversion table defines a non-linear relationship between the exciting current I and an open area A of the linear solenoid valve 41. Then, the area-pressure converter 61 converts the suitable open area Ac to the suitable hydraulic pressure Pc by using the pressure-area conversion table shown in FIG. 7. The pressure-area conversion table defines a non-linear relationship between the open area A and the output pressure PO.

The filter section 63 corrects the suitable hydraulic pressure Pc to a corrected hydraulic pressure Pr by using a notch filter (i.e., band-stop filter) for damping a resonant frequency component of a vibration model of the output pressure PO of the linear solenoid valve 41. A transfer function G1($s$) of the notch filter is given by the following formula (1), where "s" represents a complex variable:

$$G1(s) = G^{-1}(s) \times G2(s) \tag{1}$$

$G^{-1}(s)$ in the formula (1) is the reciprocal of a transfer function G of the vibration model of the output pressure PO of the linear solenoid valve 41. $G^{-1}(s)$ is given by the following formula (2);

$$G^{-1}(s) = \frac{(s^2 + 2 \times d \times \omega_P \times s + \omega_P^2)}{K} \times \omega_P^2 \tag{2}$$

In the formula (2), "$\omega_P$" represents a resonance frequency, "d" represents a damping coefficient, and "K" represents a gain constant of the vibration model. The vibration model is a secondary vibration system having a resonance point at the value $\omega_P$. A model having $G^{-1}(s)$ as a transfer function is hereinafter referred to as the "inverse model".

$G2(s)$ in the formula (1) corresponds to a transfer function of a low-pass filter and is given by the following formula (3):

$$G2(s) = \left[\frac{\omega_{C1}}{(s + \omega_{C1})}\right]^2 \tag{3}$$

In the formula (3), "$\omega_{C1}$" represents a cutoff frequency and is higher than the resonance frequency $\omega_P$.

Thus, the transfer function G1($s$) of the notch filter is expressed as a product of the transfer function $G^{-1}(s)$ of the inverse model and the transfer function G2($s$) of the low-pass filter having the cutoff frequency $\omega_{C1}$ higher than the resonance frequency $\omega_P$ of the vibration model.

Figure 10:
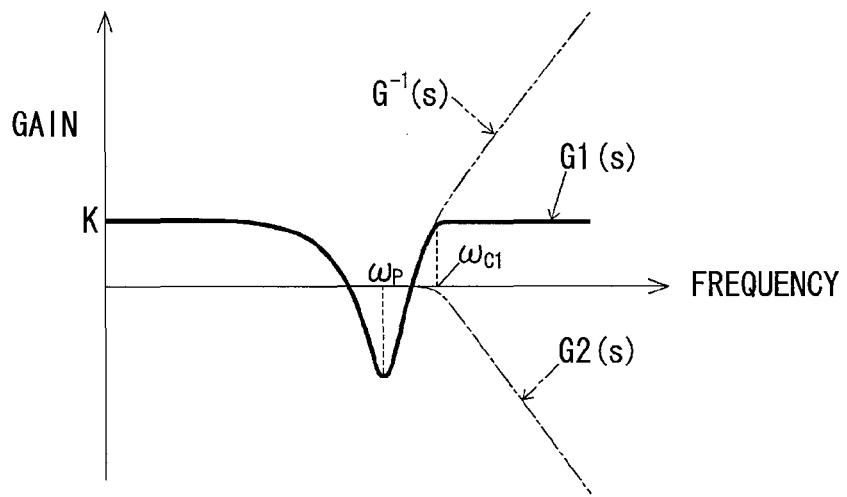
FIG. 10 is a Bode diagram illustrating a gain curve indicating a frequency response of a filter section of the correction section.

As can be seen from a Bode diagram shown in FIG. 10, the cutoff frequency $\omega_{C1}$ is set to the highest frequency within a range where a gain curve of the reverse model, indicated by a two-dot chain line, is equal to or less than the gain constant K.

The second converter 67 converts the corrected hydraulic pressure Pr, which is outputted from the filter section 63, to a corrected duty cycle Dr that is the form suitable for output to the driver circuit 47. Firstly, the pressure-area converter 64 converts the corrected hydraulic pressure Pr to a corrected open area Ar by using the pressure-area conversion table shown in FIG. 7. Then, the area-current converter 65 converts the corrected open area Ar to a corrected exciting current Ir by using the area-current conversion table shown in FIG. 8. Then, the current-duty converter 66 converts the corrected exciting current Ir to the corrected duty cycle Dr by using the current-duty conversion table shown in FIG. 9.

Returning to FIG. 4, the operation section 68 outputs the operation signal having the corrected duty cycle Dr to the driver circuit 47, thereby controlling the exciting current I of the linear solenoid valve 41.

Figure 11:
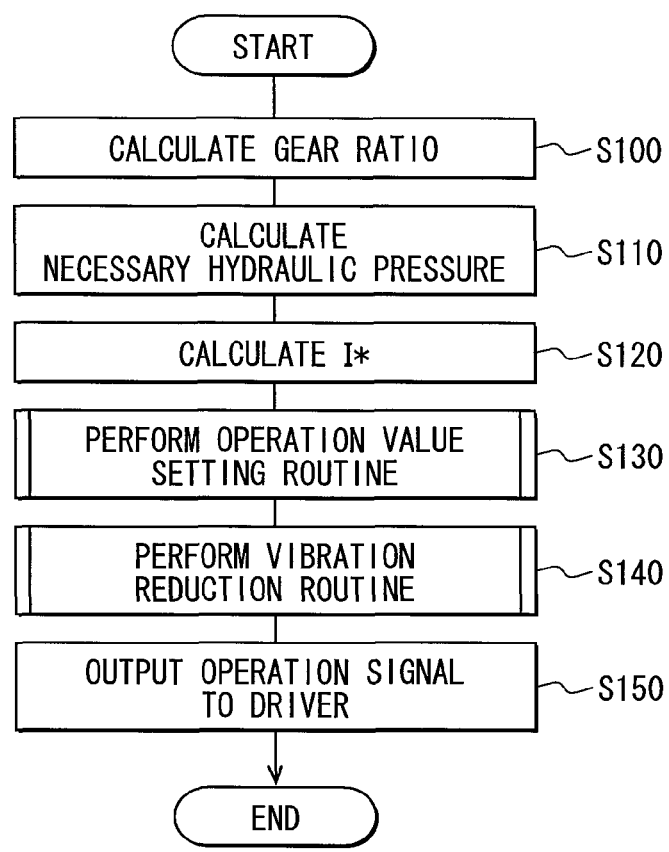
FIG. 11 is a flow chart of a control process executed by the hydraulic pressure controller.
Figure 12:
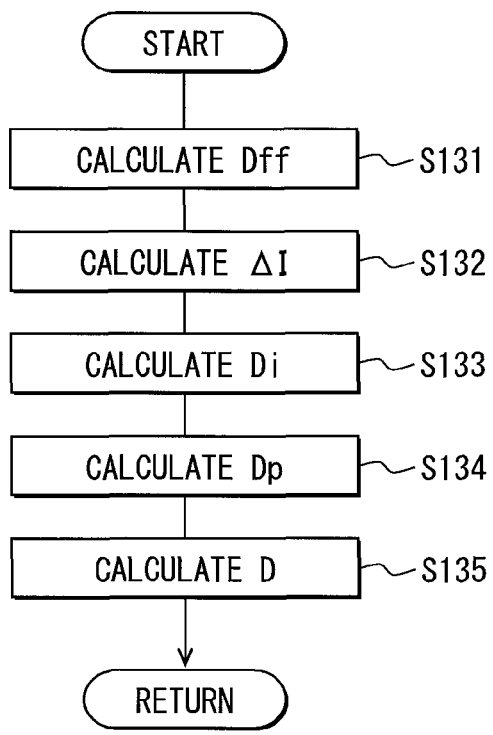
FIG. 12 is a flow chart of an operation value setting routine included in the control process.
Figure 13:
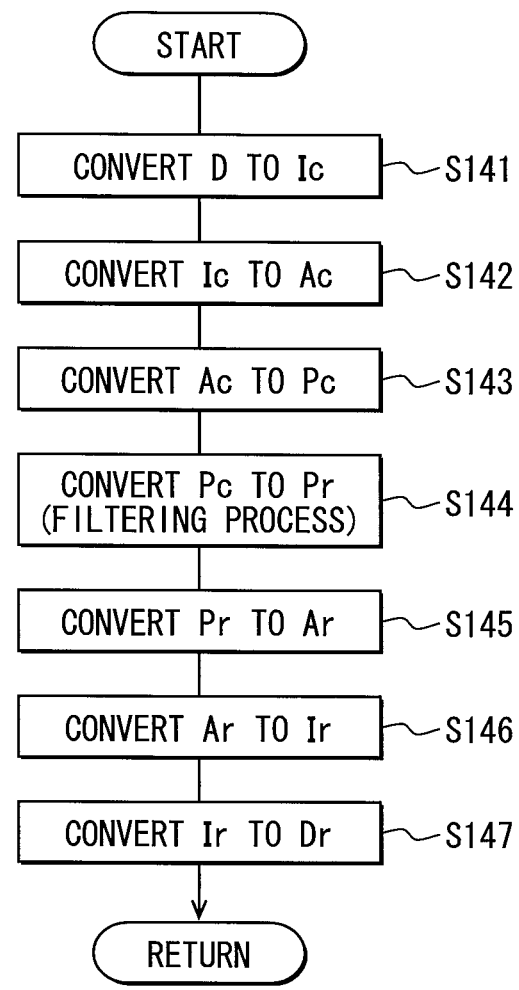
FIG. 13 is a flow chart of a vibration reduction routine included in the control process.

Next, the control process executed by the hydraulic pressure controller 50 is described below with reference to FIGS. 11-13. FIG. 11 is a main flow chart of the control process. The hydraulic pressure controller 50 repeatedly executes the control process based on the program stored in the ROM at a predetermined time interval until the engine 12 is stopped after the engine 12 is started. The parameters used in the control process are stored in, for example, the RAM and updated as needed.

The control process starts at S100, where the gear ratio of the CVT 20 is calculated based on the input rotation speed NIN and the running speed V.

Then, the control process proceeds to S110, where the necessary hydraulic pressure in the hydraulic cylinder 26 is calculated based on the gear ratio and the input shaft torque NT by using the hydraulic pressure calculation table stored in the ROM.

Figure 7:
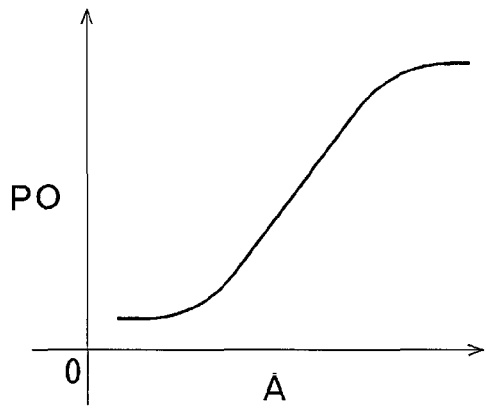
FIG. 7 is a diagram illustrating a pressure-area conversion table used in the hydraulic pressure controller.
Figure 8:
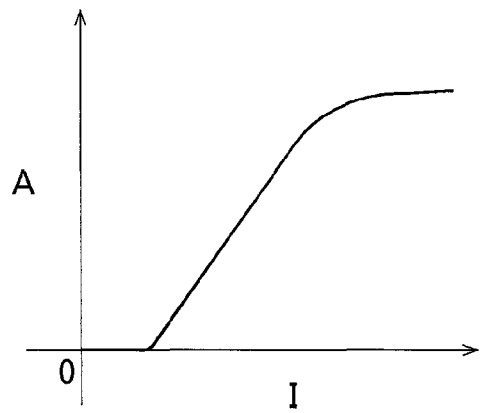
FIG. 8 is a diagram illustrating an area-current conversion table used in the hydraulic pressure controller.

Then, the control process proceeds to S120, where the target exciting current I* is calculated based on the necessary hydraulic pressure by using the pressure-area conversion table shown in FIG. 7 and the area-current conversion table shown in FIG. 8.

Then, the control process proceeds to S130, where an operation value setting routine for setting the duty cycle D of the operation signal inputted to the driver circuit 47 is performed. FIG. 12 illustrates a flow chart of the operation value setting routine.

The operation value setting routine starts at S131, where the feedforward term Dff is calculated based on the target exciting current I*.

Then, the operation value setting routine proceeds to S132, where the deviation ΔI between the target exciting current I* and the actual exciting current I is calculated.

Then, the operation value setting routine proceeds to S133, where the integral term Di is calculated based on the deviation ΔI.

Then, the operation value setting routine proceeds to S134, where the proportional term Dp is calculated based on the deviation ΔI.

Then, the operation value setting routine proceeds to S135, where the duty cycle D is calculated by adding the feedforward term Dff, the integral term Di, and the proportional term Dp together. After S135, the control process returns to the main flow shown in FIG. 11. In this way, the operation value setting routine adjusts the duty cycle D of the operation signal so that the deviation ΔI between the target exciting current I* and the actual exciting current I can be reduced.

Returning to FIG. 11, after S130, the control process proceeds to S140, where a vibration reduction routine for correcting the duty cycle D to the corrected duty cycle Dr so that vibration in the output pressure PO of the linear solenoid valve 41 can be reduced. FIG. 13 illustrates a flow chart of the vibration reduction routine.

Figure 9:
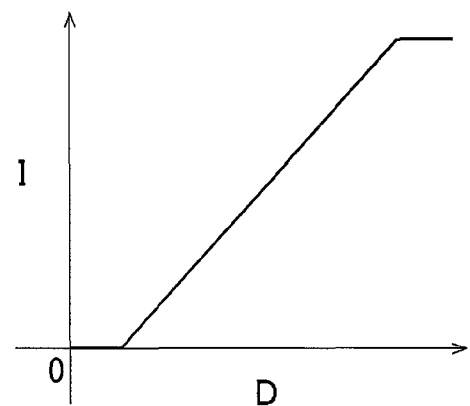
FIG. 9 is a diagram illustrating a current-duty conversion table used in the hydraulic pressure controller.

The vibration reduction routine starts at S141, where the duty cycle D is converted to the suitable exciting current Ic by using the current-duty conversion table shown in FIG. 9.

Then, the vibration reduction routine proceeds to S142, where the suitable exciting current Ic is converted to the suitable open area Ac by using the area-current conversion table shown in FIG. 8.

Then, the vibration reduction routine proceeds to S143, where the suitable open area Ac is converted to the suitable hydraulic pressure Pc by using the pressure-area conversion table shown in FIG. 7.

Then, the vibration reduction routine proceeds to S144, where the suitable hydraulic pressure Pc is corrected to the corrected hydraulic pressure Pr by using the notch filter which has the transfer function $G1(s)$ given by the formula (1). The notch filter serves to damp the resonant frequency component of the output pressure PO of the linear solenoid valve 41.

Then, the vibration reduction routine proceeds to S145, where the corrected hydraulic pressure Pr is converted to the corrected open area Ar by using the pressure-area conversion table shown in FIG. 7.

Then, the vibration reduction routine proceeds to S146, where the corrected open area Ar is converted to the corrected exciting current Ir by using the area-current conversion table shown in FIG. 8.

Then, the vibration reduction routine proceeds to S147, where the corrected exciting current Ir is converted to the corrected duty cycle Dr by using the current-duty conversion table shown in FIG. 9. After S147, the control process returns to the main flow shown in FIG. 11.

Returning to FIG. 11, after S140, the control process proceeds to S150, where the operation signal having the corrected duty cycle Dr is outputted to the driver circuit 47 so that the exciting current I of the linear solenoid valve 41 can be controlled. After S150, the control process is ended.

Figure 14:
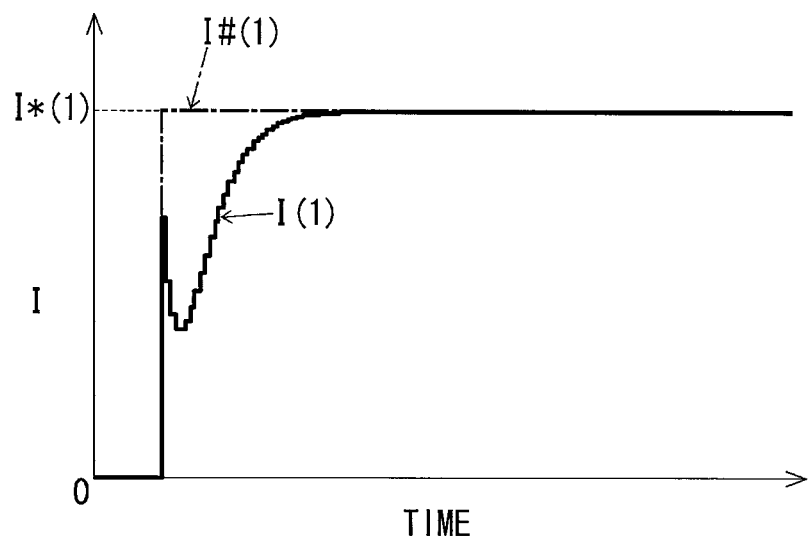
FIG. 14 is a diagram illustrating a change with time in an actual exciting current supplied from the driver circuit to the linear solenoid valve.

FIG. 14 shows a change with time in an exciting current I(1) supplied from the driver circuit 47 to the linear solenoid valve 41 when the target exciting current I* is set to a predetermined value I*(1). As indicated by a solid line in FIG. 14, in the hydraulic pressure controller 50 according to the first embodiment, the exciting current I(1) rises sharply to about 70% of the predetermined value I*(1), falls to about 40% of the predetermined value I*(1), and then gradually increases to the predetermined value I*(1). In contrast, as indicated by a single dot line in FIG. 14, in a conventional hydraulic pressure controller, an exciting current I#(1) is outputted in a stepwise manner.

Figure 15:
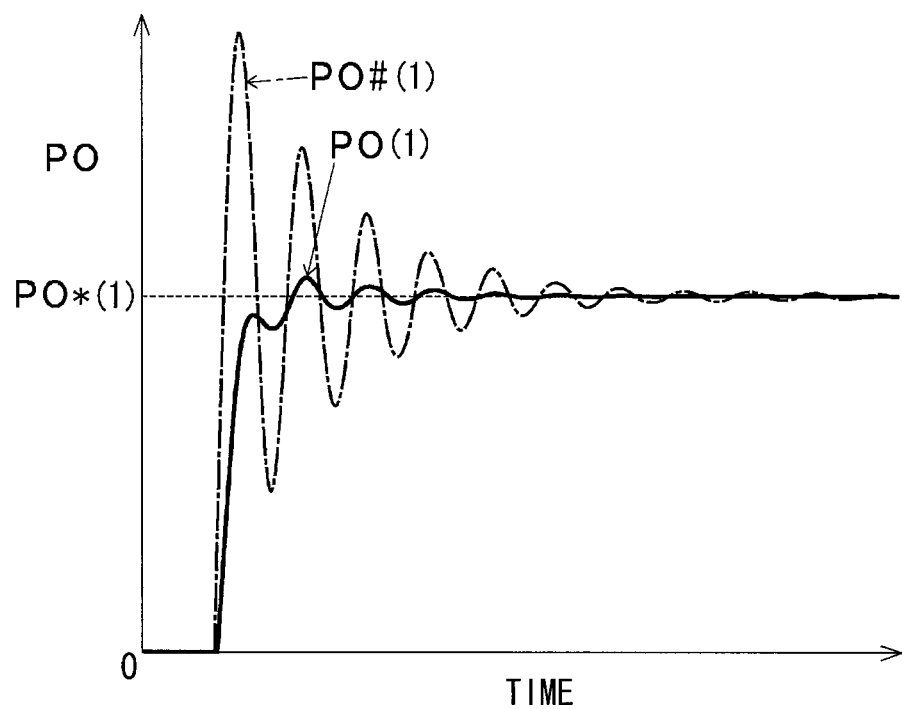
FIG. 15 is a diagram illustrating a change with time in output pressure of the linear solenoid valve in response to the actual exciting current.

FIG. 15 shows a change with time in output pressure PO(1) of the linear solenoid valve 41 when the exciting current I(1) shown in FIG. 14 is supplied to the linear solenoid valve 41. As indicated by a solid line in FIG. 15, in the hydraulic pressure controller 50 according to the first embodiment, the output pressure PO(1) converges rapidly to a predetermined value PO*(1) with a slight vibration amplitude. In contrast, in the conventional hydraulic pressure controller, as indicated by a single dot line in FIG. 15, output pressure PO#(1) converges slowly to the predetermined value PO*(1) with a large vibration amplitude.

As described above, according to the first embodiment, the hydraulic pressure controller 50 converts the duty cycle D, which is the operation value of the control system, to the suitable hydraulic pressure Pc. Then, the hydraulic pressure controller 50 corrects the suitable hydraulic pressure Pc to the corrected hydraulic pressure Pr by using the notch filter for damping the resonant frequency component of the vibration model of the output pressure PO of the linear solenoid valve 41. Then, the hydraulic pressure controller 50 converts the corrected hydraulic pressure Pr to the corrected duty cycle Dr. Then, the hydraulic pressure controller 50 outputs the operation signal having the corrected duty cycle Dr to the driver circuit 47 for driving the linear solenoid valve 41.

The notch filter serves to cancel the resonance of the output pressure PO of the linear solenoid valve 41. Thus, even when the exciting current I of the coil 42 of the linear solenoid valve 41 is sharply changed in a stepwise manner, vibration in the output pressure PO of the linear solenoid valve 41 can be reduced. Therefore, it is possible to sharply change the exciting current I of the coil 42 in a stepwise manner. Accordingly, the vibration in the output pressure PO can be reduced without a reduction in responsivity of the output pressure PO of the linear solenoid valve 41.

Further, according to the first embodiment, the transfer function $G1(s)$ of the notch filter is expressed as a product of the transfer function $G^{-1}(s)$ of the inverse model of the vibration model of the output pressure PO of the linear solenoid valve 41 and the transfer function $G2(s)$ of the low-pass filter having the cutoff frequency $\omega_{C1}$ higher than the resonance frequency $\omega_P$ of the vibration model. The cutoff frequency $\omega_{C1}$ is set to the highest frequency within the range where the gain curve of the reverse model is equal to or less than the gain constant K of the transfer function $G^{-1}(s)$. Thus, the resonant frequency component of the vibration model can be damped adequately.

Further, according to the first embodiment, the operation value setting section 52 calculates the deviation ΔI between the target exciting current I* and the actual exciting current I and performs a feedback control of the duty cycle of the operation signal in such a manner that the deviation ΔI can be reduced. Thus, the responsivity of the output pressure PO of the linear solenoid valve 41 can be improved.

(Second Embodiment)

Figure 16:
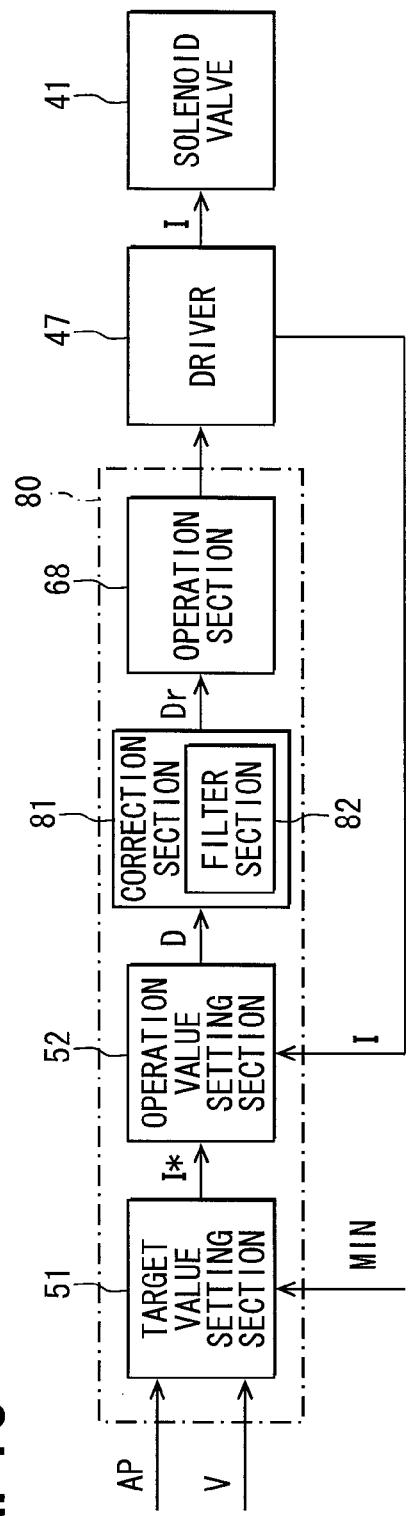
FIG. 16 is a block diagram of a hydraulic pressure controller according to a second embodiment of the present disclosure.

A hydraulic pressure controller 80 according to a second embodiment of the present disclosure is described below with reference to FIG. 16. A difference between the hydraulic pressure controller 80 and the hydraulic pressure controller 50 is that the hydraulic pressure controller 80 has a correction section 81 instead of the correction section 58. A transfer function $G3(s)$ of a notch filter used by a filter section 82 of the correction section 81 is given by the following formula (4):

$$G3(s)=G^{-1}(s) \times G4(s) \quad (4)$$

$G4(s)$ in the formula (4) corresponds to a transfer function of a low-pass filter. $G4(s)$ is given by the following formula (5):

$$G4(s) = \left[\frac{\omega_{C2}}{(s+\omega_{C2})}\right]^3 \quad (5)$$

Thus, the transfer function $G3(s)$ of the notch filter is expressed as a product of the transfer function $G^{-1}(s)$ of the inverse model and the transfer function $G4(s)$ of the low-pass filter having a cutoff frequency $\omega_{C2}$ higher than the resonance frequency $\omega_P$ of the vibration model.

Figure 17:
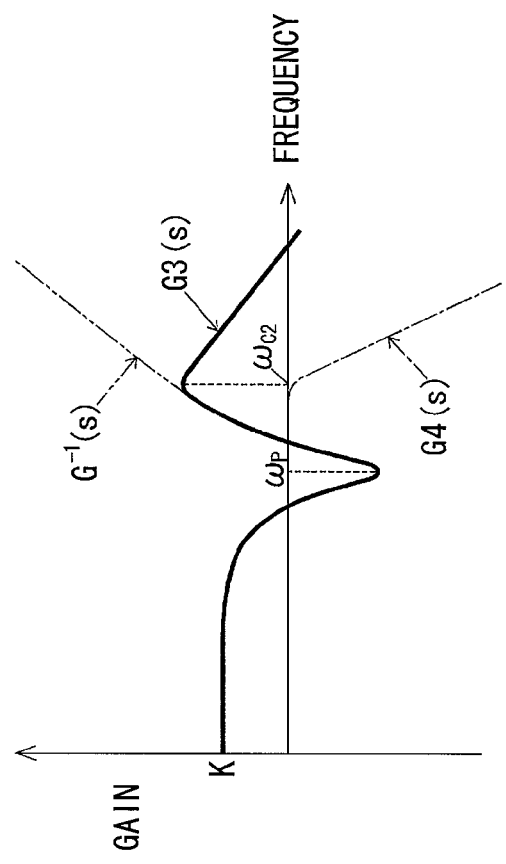
FIG. 17 is a Bode diagram illustrating a gain curve indicating a frequency response of a filter section of the hydraulic pressure controller according to the second embodiment.

As can be seen from a Bode diagram shown in FIG. 17, the cutoff frequency $\omega_{C2}$ is set to a value greater than the highest frequency by a predetermined value within a range where a gain curve of the reverse model, indicated by a two-dot chain line, is equal to or less than the gain constant K.

In such an approach, according to the second embodiment, the responsivity of the output pressure PO of the linear solenoid valve 41 can be further improved.

(Third Embodiment)

Figure 18:
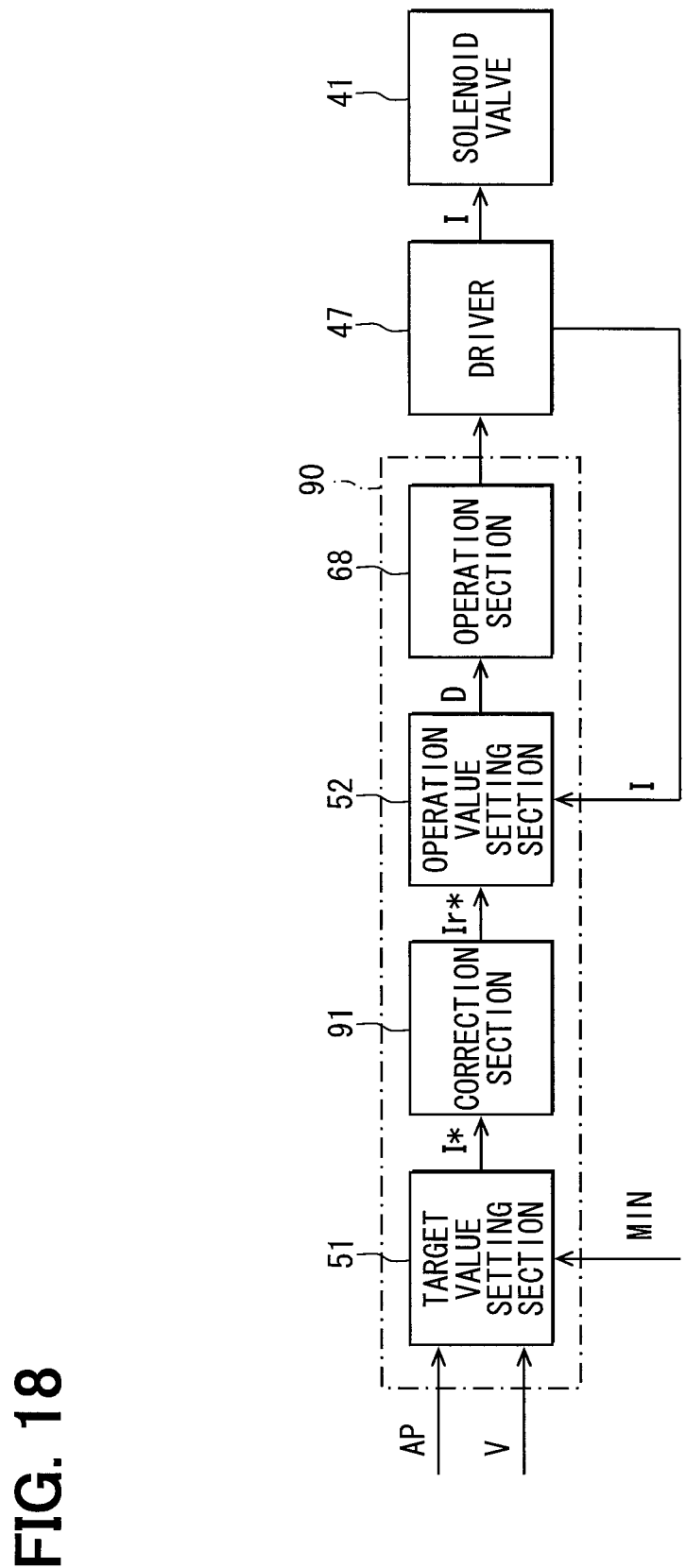
FIG. 18 is a block diagram of a hydraulic pressure controller according to a third embodiment of the present disclosure.
Figure 19:
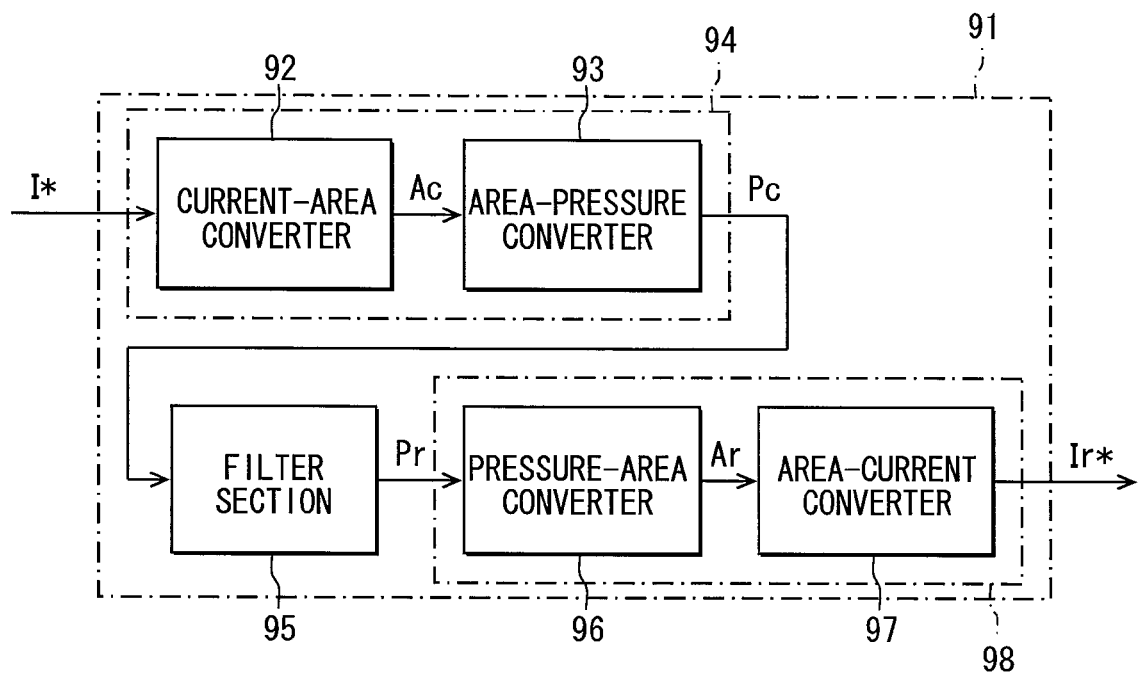
FIG. 19 is a block diagram of a correction section of the hydraulic pressure controller according to the third embodiment.

A hydraulic pressure controller 90 according to a third embodiment of the present disclosure is described below with reference to FIGS. 18 and 19. A correction section 91 of the hydraulic pressure controller 90 corrects the target exciting current I* to a corrected target exciting current Ir* by using the same notch filter used in the filter section 63 of the first embodiment before the target exciting current I* is inputted to the operation value setting section 52. Specifically, as shown in FIG. 19, the correction section 91 includes a first converter 94, a filter section 95, and a second converter 98. The first converter 94 has a current-area converter 92 and an area-pressure converter 93. The second converter 98 has a pressure-area converter 96 and an area-current converter 97.

The first converter 94 converts the target exciting current I* to the suitable hydraulic pressure Pc which is the form suitable for a filtering process in the filter section 95. Firstly, the current-area converter 92 converts the target exciting current I* to the suitable open area Ac. Then, the area-pressure converter 93 converts the suitable open area Ac to the suitable hydraulic pressure Pc. The filter section 95 corrects the suitable hydraulic pressure Pc to the corrected hydraulic pressure Pr by using the same notch filter used in the filter section 63 of the first embodiment.

The second converter 98 converts the corrected hydraulic pressure Pr, which is outputted from the filter section 95, to the corrected target exciting current Ir*. Firstly, the pressure-area converter 96 converts the corrected hydraulic pressure Pr to the corrected open area Ar. Then, the area-current converter 97 converts the corrected open area Ar to the corrected target exciting current Ir*. The operation value setting section 52 sets the duty cycle D based on the corrected target exciting current Ir* and the actual exciting current I.

As described above, according to the third embodiment, the target exciting current is corrected by using the notch filter. Thus, like the hydraulic pressure controller 50 of the first embodiment, the hydraulic pressure controller 90 can reduce the vibration in the output pressure PO without a reduction in responsivity of the output pressure PO of the linear solenoid valve 41.

(Fourth Embodiment)

Figure 20:
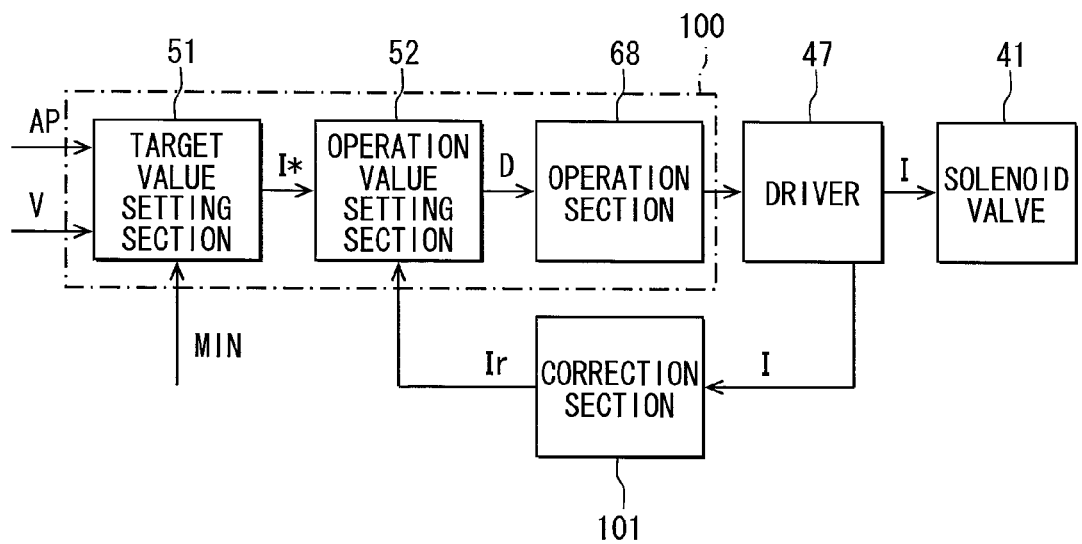
FIG. 20 is a block diagram of a hydraulic pressure controller according to a fourth embodiment of the present disclosure.
Figure 21:
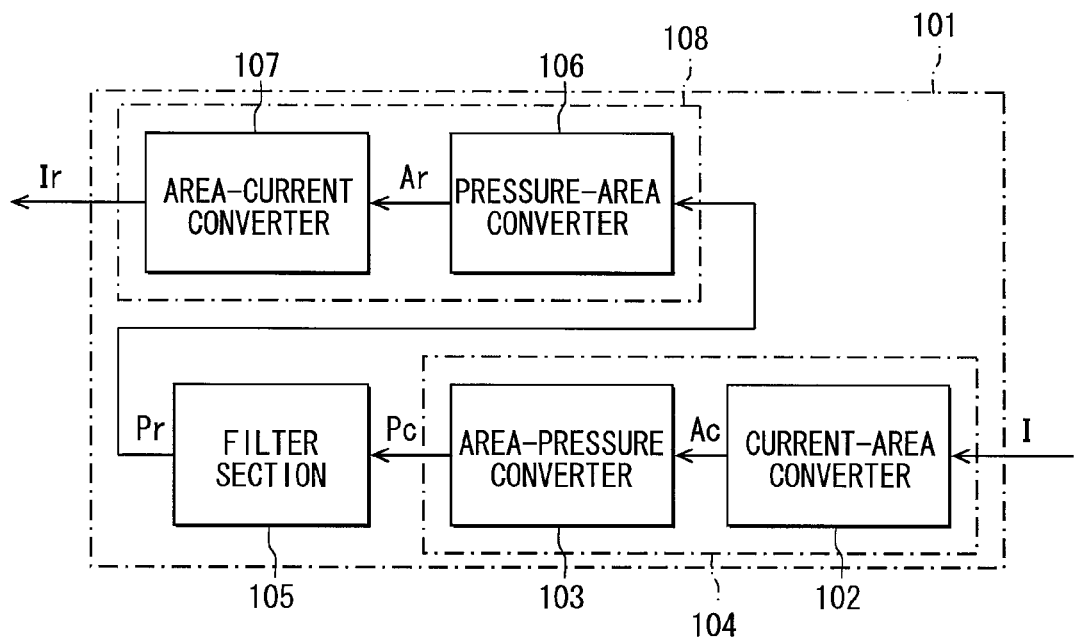
FIG. 21 is a block diagram of a correction section of the hydraulic pressure controller according to the fourth embodiment.

A hydraulic pressure controller 100 according to a fourth embodiment of the present disclosure is described below with reference to FIGS. 20 and 21. A correction section 101 of the hydraulic pressure controller 100 corrects the actual exciting current I to the corrected exciting current Ir by using the same notch filter used in the filter section 63 of the first embodiment before the actual exciting current I is inputted to the operation value setting section 52. Specifically, as shown in FIG. 21, the correction section 101 includes a first converter 104, a filter section 105, and a second converter 108. The first converter 104 has a current-area converter 102 and an area-pressure converter 103. The second converter 108 has a pressure-area converter 106 and an area-current converter 107.

The first converter 104 converts the actual exciting current I to the suitable hydraulic pressure Pc which is the form suitable for a filtering process in the filter section 105. Firstly, the current-area converter 102 converts the actual exciting current I to the suitable open area Ac. Then, the area-pressure converter 103 converts the suitable open area Ac to the suitable hydraulic pressure Pc. The filter section 105 corrects the suitable hydraulic pressure Pc to the corrected hydraulic pressure Pr by using the same notch filter used in the filter section 63 of the first embodiment.

The second converter 108 converts the corrected hydraulic pressure Pr, which is outputted from the filter section 105, to the corrected exciting current Ir. Firstly, the pressure-area converter 106 converts the corrected hydraulic pressure Pr to the corrected open area Ar. Then, the area-current converter 107 converts the corrected open area Ar to the corrected exciting current Ir. The operation value setting section 52 sets the duty cycle D based on the target exciting current I* and the corrected exciting current Ir.

As described above, according to the fourth embodiment, the actual exciting current is corrected by using the notch filter. Thus, like the hydraulic pressure controller 50 of the first embodiment, the hydraulic pressure controller 100 can reduce the vibration in the output pressure PO without a reduction in responsivity of the output pressure PO of the linear solenoid valve 41.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The filter used in the filter section of the hydraulic pressure controller is not limited to a specific filter, as long as the filter can damp or eliminate the resonant frequency component of the vibration model of the output pressure of the solenoid valve. "Damping or eliminating the resonant frequency component" means not only to damp or eliminate all components within the resonance frequency band but also to damp or eliminate some components within the resonance frequency band.

The low-pass filter coupled to the inverse model is not limited to those described in the embodiments. For example, the cutoff frequency of the low-pass filter is not limited to $\omega_{C1}$ or $\omega_{C2}$.

The first converter can convert the duty cycle or the exciting current directly to the suitable hydraulic pressure.

The second converter can convert the corrected hydraulic pressure directly to the corrected duty cycle or the corrected exciting current.

The hydraulic pressure controller can be applied to not only a linear solenoid valve but also an electromagnetic valve that is duty-controlled to change hydraulic pressure. The hydraulic pressure controller can control output pressure of an electromagnetic on-off valve used for gear shift control of the CVT. The hydraulic pressure controller can control signal pressure to the pressure regulating valve of the hydraulic actuator of the CVT. The hydraulic pressure controller can control supply pressure to the hydraulic actuator of the CVT. The transmission of the vehicle is not limited to a CVT and can have a finite number of gear ratios. That is, the hydraulic pressure controller according to the present disclosure can control output pressure of any solenoid valve in an oil-hydraulic circuit of a transmission of a vehicle.

The target value setting section can calculate the target exciting current of the solenoid valve based on a signal that is inputted in response to a manual operation performed by a driver of the vehicle.

The program executed by the hydraulic pressure controller can be stored in a computer-readable tangible media other than the ROM. For example, the program can be stored in a non-volatile computer storage device such as a flash memory.

What is claimed is:

1. A hydraulic pressure controller for controlling output pressure of a solenoid valve in an oil-hydraulic circuit of a transmission of a vehicle, the hydraulic pressure controller comprising:

a target value acquiring section configured to acquire a target exciting current which is a target value for an exciting current of the solenoid valve;

an actual value acquiring section configured to acquire an actual exciting current which is an actual measured value of the exciting current of the solenoid valve;

an operation value setting section configured to set a duty cycle of an operation signal based on the target exciting current and the actual exciting current, the operation signal being inputted to a driver circuit for driving the solenoid valve; and a correction section configured to correct at least one of the duty cycle, the target exciting current, and the actual exciting current by using a filter for eliminating or damping a resonant frequency component of a vibration model of the output pressure of the solenoid valve, wherein the correction section includes a first converter, a filter section, and a second converter, the first converter converts the duty cycle to a suitable hydraulic pressure, which is the form suitable for a filtering process in the filter section, by using a relationship between the duty cycle and a steady-state output pressure of the solenoid valve, the filter section outputs a corrected hydraulic pressure by performing the filtering process on the suitable hydraulic pressure, and the second converter converts the corrected hydraulic pressure to a corrected duty cycle by using the relationship.

2. The hydraulic pressure controller according to claim 1, wherein the first converter converts the target exciting current to the suitable hydraulic pressure, which is the form suitable for the filtering process in the filter section, by using a relationship between the exciting current of the solenoid valve and a steady-state output pressure of the solenoid valve, the second converter converts the corrected hydraulic pressure to a corrected target exciting current by using the relationship.

3. The hydraulic pressure controller according to claim 1, wherein the first converter converts the actual exciting current to the suitable hydraulic pressure, which is the form suitable for the filtering process in the filter section, by using a relationship between the exciting current of the solenoid valve and a steady-state output pressure of the solenoid valve, the second converter converts the corrected hydraulic pressure to a corrected exciting current by using the relationship.

4. The hydraulic pressure controller according to claim 1, wherein a transfer function of the filter is expressed as a product of a first transfer function, which is the reciprocal of a transfer function of the vibration model, and a second transfer function of a low-pass filter having a cutoff frequency higher than a resonance frequency of the vibration model.

5. The hydraulic pressure controller according to claim 4, wherein the cutoff frequency is set to a value greater than the highest frequency by a predetermined value within a range where a gain curve of the first transfer function is equal to or less than a gain constant K of the first transfer function.

6. The hydraulic pressure controller according to claim 1, wherein
the operation value setting section includes a comparator and a feedback controller,
the comparator calculates a deviation between the target exciting current and the actual exciting current, and
the feedback controller sets the duty cycle in such a manner that the deviation is reduced.

7. The hydraulic pressure controller according to claim 1, wherein
the output pressure of the solenoid valve is signal pressure to a pressure regulating valve of a hydraulic actuator of the transmission.

8. The hydraulic pressure controller according to claim 1, wherein
the output pressure of the solenoid valve is supply pressure to a hydraulic actuator of the transmission.

9. A method for controlling output pressure of a solenoid valve in an oil-hydraulic circuit of a transmission of a vehicle, the method comprising:
acquiring a target exciting current which is a target value for an exciting current of the solenoid valve;
acquiring an actual exciting current which is an actual measured value of the exciting current of the solenoid valve;
setting a duty cycle of an operation signal based on the target exciting current and the actual exciting current, the operation signal being inputted to a driver circuit for driving the solenoid valve; and
correcting at least one of the duty cycle, the target exciting current, and the actual exciting current by using a filter for eliminating or damping a resonant frequency component of a vibration model of the output pressure of the solenoid valve, wherein:
the duty cycle is converted to a suitable hydraulic pressure, which is the form suitable for a filtering process, by using a relationship between the duty cycle and a steady-state output pressure of the solenoid valve,
a corrected hydraulic pressure is outputted by performing the filtering process on the suitable hydraulic pressure, and
the corrected hydraulic pressure is converted to a corrected duty cycle by using the relationship.

10. A non-transitory computer-readable tangible media comprising machine-readable instructions that direct a computer to:
a. acquire a target exciting current which is a target value for an exciting current of a solenoid valve in an oil-hydraulic circuit of a transmission of a vehicle;
b. acquire an actual exciting current which is an actual measured value of the exciting current of the solenoid valve;
c. set a duty cycle of an operation signal based on the target exciting current and the actual exciting current, the operation signal being inputted to a driver circuit for driving the solenoid valve; and
d. correct at least one of the duty cycle, the target exciting current, and the actual exciting current by using a filter for eliminating or damping a resonant frequency component of a vibration model of output pressure of the solenoid valve, wherein:
the duty cycle is converted to a suitable hydraulic pressure, which is the form suitable for a filtering process, by using a relationship between the duty cycle and a steady-state output pressure of the solenoid valve,
a corrected hydraulic pressure is outputted by performing the filtering process on the suitable hydraulic pressure, and
the corrected hydraulic pressure is converted to a corrected duty cycle by using the relationship.

11. A hydraulic pressure controller for controlling output pressure of a solenoid valve in an oil-hydraulic circuit of a transmission of a vehicle, the hydraulic pressure controller comprising:
a target value acquiring section configured to acquire a target exciting current which is a target value for an exciting current of the solenoid valve;
an actual value acquiring section configured to acquire an actual exciting current which is an actual measured value of the exciting current of the solenoid valve;
an operation value setting section configured to set a duty cycle of an operation signal based on the target exciting current and the actual exciting current, the operation signal being inputted to a driver circuit for driving the solenoid valve; and
a correction section configured to correct at least one of the duty cycle, the target exciting current, and the actual exciting current by using a filter for eliminating or damping a resonant frequency component of a vibration model of the output pressure of the solenoid valve; wherein:
the correction section includes a first converter, a filter section, and a second converter,
the first converter converts the target exciting current to a suitable hydraulic pressure, which is the form suitable for a filtering process in the filter section, by using a relationship between the exciting current of the solenoid valve and a steady-state output pressure of the solenoid valve,
the filter section outputs a corrected hydraulic pressure by performing the filtering process on the suitable hydraulic pressure, and
the second converter converts the corrected hydraulic pressure to a corrected target exciting current by using the relationship.

12. A hydraulic pressure controller for controlling output pressure of a solenoid valve in an oil-hydraulic circuit of a transmission of a vehicle, the hydraulic pressure controller comprising:
a target value acquiring section configured to acquire a target exciting current which is a target value for an exciting current of the solenoid valve;
an actual value acquiring section configured to acquire an actual exciting current which is an actual measured value of the exciting current of the solenoid valve;
an operation value setting section configured to set a duty cycle of an operation signal based on the target exciting current and the actual exciting current, the operation signal being inputted to a driver circuit for driving the solenoid valve; and
a correction section configured to correct at least one of the duty cycle, the target exciting current, and the actual exciting current by using a filter for eliminating or damping a resonant frequency component of a vibration model of the output pressure of the solenoid valve, wherein:
the correction section includes a first converter, a filter section, and a second converter
the first converter converts the actual exciting current to a suitable hydraulic pressure, which is the form suitable for a filtering process in the filter section, by using a relationship between the exciting current of the solenoid valve and a steady-state output pressure of the solenoid valve, the filter section outputs a corrected hydraulic pressure by performing the filtering process on the suitable hydraulic pressure, and the second converter converts the corrected hydraulic pressure to a corrected exciting current by using the relationship.

* * * * *